(12) United States Patent
Byers et al.

(10) Patent No.: US 11,494,346 B2
(45) Date of Patent: *Nov. 8, 2022

(54) COMPOSITE FILE SYSTEM COMMANDS

(71) Applicant: Oracle International Corporation, Redwood Shores, CA (US)

(72) Inventors: Brandon Byers, San Diego, CA (US); Stephen Hooper, Escondido, CA (US)

(73) Assignee: Oracle International Comporation, Redwood Shores, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 16/919,459

(22) Filed: Jul. 2, 2020

(65) Prior Publication Data

US 2020/0334213 A1 Oct. 22, 2020

Related U.S. Application Data

(63) Continuation of application No. 15/471,267, filed on Mar. 28, 2017, now Pat. No. 10,740,303.

(51) Int. Cl.
*G06F 15/16* (2006.01)
*G06F 16/182* (2019.01)
*G06F 16/13* (2019.01)
*G06F 16/14* (2019.01)
*G06F 16/17* (2019.01)

(52) U.S. Cl.
CPC ............ *G06F 16/183* (2019.01); *G06F 16/13* (2019.01); *G06F 16/148* (2019.01); *G06F 16/17* (2019.01)

(58) Field of Classification Search
None
See application file for complete search history.

(56) References Cited

U.S. PATENT DOCUMENTS

| | | |
|---|---|---|
| 9,021,010 B1 | 4/2015 | Das et al. |
| 2014/0108471 A1 | 4/2014 | Liu et al. |
| 2014/0122424 A1 | 5/2014 | Barnes et al. |
| 2014/0156717 A1* | 6/2014 | Krishna ................ G06F 16/122 707/830 |
| 2014/0379648 A1* | 12/2014 | Chiu ..................... G06F 16/178 707/624 |
| 2016/0294606 A1 | 10/2016 | Puri et al. |
| 2017/0024410 A1 | 1/2017 | Pola |

OTHER PUBLICATIONS

Anonymous: "File system—Wikipedia", Dec. 24, 2016, XP055858237, Retrieved from the Internet: URL:https://en.wikipedia.org/w/index.php? title=File_system&oldid=756453600 [retrieved on Nov. 5, 2021].

(Continued)

*Primary Examiner* — Alex Gofman
(74) *Attorney, Agent, or Firm* — Invoke

(57) ABSTRACT

Techniques for processing composite commands in a file system are disclosed. A file system receives a composite command that includes an argument. The file system parses the argument and encounters a particular flag indicating that the argument includes an additional command. The file system executes the additional command using an application programming interface (API).

20 Claims, 6 Drawing Sheets

(56) References Cited

OTHER PUBLICATIONS

Anonymous: "Scratching My Needs: ssh—How to pipe output from local to remote server", Dec. 7, 2016, XP055857958, Retrieved from the Internet:URL:https://web.archive.org/web/20161207115505/http://scratching.psybermonkey.net/2011/02/ssh-how-to-pipe-output-from-local-to. html [retrieved on Nov. 4, 2021].

Anonymous: "What is Linux Kernel? Explained in Layman's Terms—Latest Hacking News", Sep. 15, 2016, XP055858253, Retrieved from the Internet:URL:https://latesthackingnews.com/2016/09/15/linux-kernel-explainedlaymans- terms/ [retrieved on Nov. 5, 2021].

Jimmy Thong: "What (really) happens when you type Is—I in the shell | by Jimmy Thong | meatandmachines | Medium," Dec. 13, 2016 (Dec. 13, 2016), XP055858249, Retrieved from the Internet: URL:https://medium.com/meatandmachines/what-really-happens-whenyou- type-Is-I-i n-the-shell-a8914950fd73 [retrieved on Nov. 5, 2021].

Anonymous: "Cloud Storage FUSE | Cloud Storage Documentation Google Cloud Platform",, Mar. 18, 2017, XP055471600, Retrieved from the Internet: URL:https://web.archive.org/web/20170318025056/https://cloud.google.com/ storage/docs/gcs-fuse [retrieved on Apr. 30, 2018].

Anonymous: "Pipeline (Unix)—Wikipedia",, Mar. 21, 2017, XP055472427, Retrieved from the Internet: URL:https://en.wikipedia.org/w/index.php?title=Pipeline_(Unix)&oldid=771452944 [retrieved on May 3, 2018].

* cited by examiner

Composite Command 402

Composite Command 404

Composite Command 406

Composite Command 408

FIG. 4E cat /users/john/documents/file1:::cache  ← Composite Command 410

A command must be provided. Available commands:

clear-preserve: Clear preserve cache list.
set-preserve-option: Configure preserve cache list option value.
list-preserve-update: Update preserve cache list to remove missing nodes.
clear: Clear the local data cache for this filesystem.
trim-bytes: Force an immediate trim of the local data cache MINIMALLY by the number of bytes passed in.
remove-preserve: Remove specified file from preserve cache list.
list-preserve: List files added to preserve cache list.
download: Download a cloud object into cache.
get-preserve-option: Get preserve cache list option value.
trim: Force an immediate trim of the local data cache ONLY if it's above the defined cache limit.
add-preserve: Add specified file to preserve cache list.
info: Get the current cache info.
status: Get stats about cache usage.

← Help Information 412

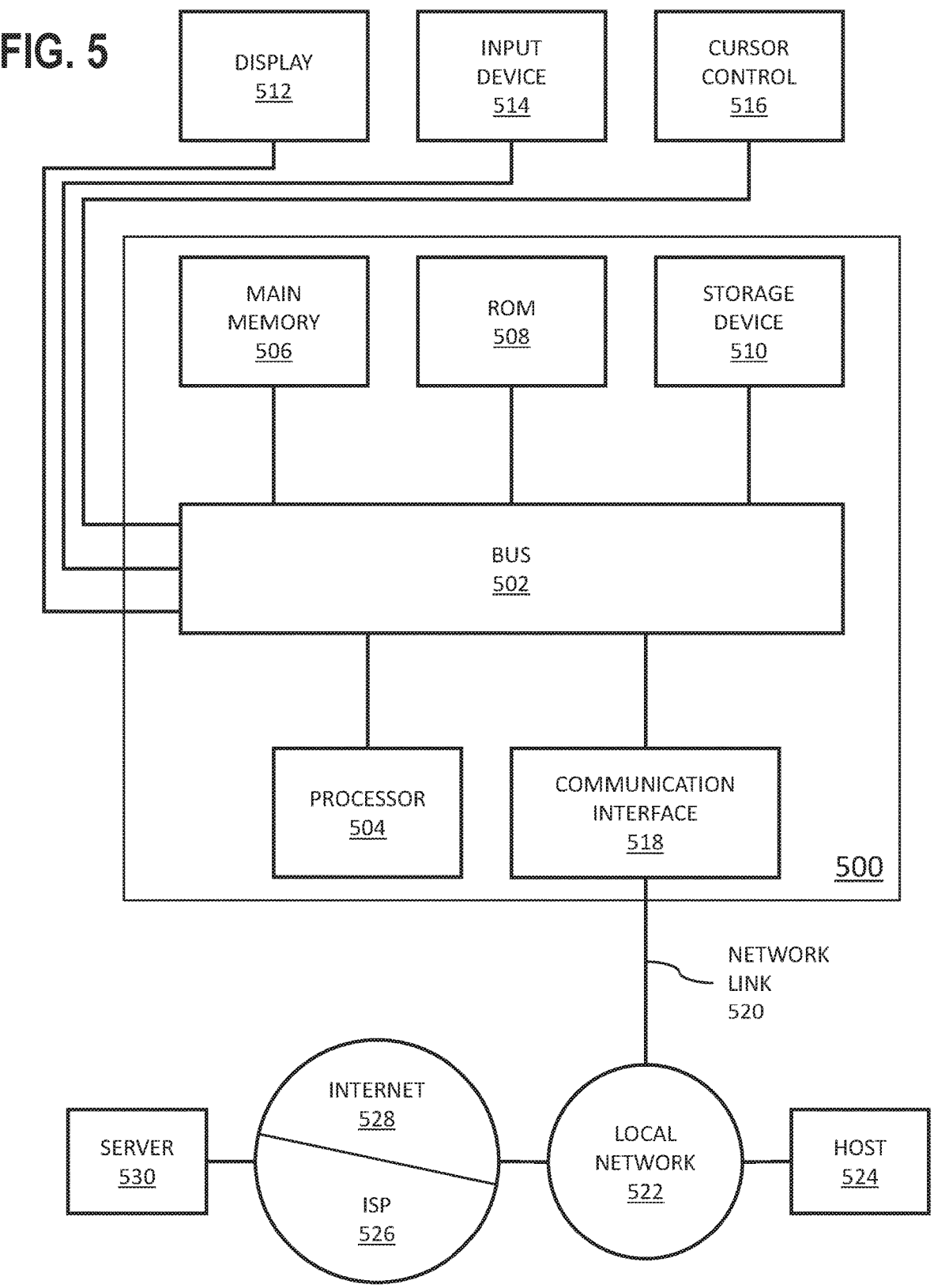

US 11,494,346 B2

COMPOSITE FILE SYSTEM COMMANDS

INCORPORATION BY REFERENCE; DISCLAIMER

The following application is hereby incorporated by reference: application Ser. No. 15/471,267 filed on Mar. 28, 2017. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to executing commands in a file system. In particular, the present disclosure relates to execution of composite commands.

BACKGROUND

In computing, a file system is a structure and set of rules for storing and retrieving data. Data is grouped into units called files. The file system determines the structure of each file. The file system also is used to manage file metadata, i.e., data that provides additional information about files. There are many different types of file systems, having many different file structures and rules. File systems may be used with many different types of storage devices and media, including hard disks, flash media, optical drives, etc. In addition, file systems may be used with multiple storage devices. For example, a file system may store files using an array of hard drives or multiple storage devices connected with each other via a computer network. Many different configurations of file system storage exist.

Many file systems include an internal application programming interface (API) for executing commands in the file system. A user may access the file system's API through a command line interface (CLI), where the user types commands in a terminal window. Alternatively, a user may access the file system's API through a graphical user interface (GUI) that allows the user to manipulate graphical elements (e.g., windows, icons, etc.) to execute file system commands. Many file systems use a standardized API, such as one defined by the Portable Operating Interface (POSIX) family of standards, or a variation thereof.

When a user attempts to execute a file system command, the file system applies internal rules (also known as authorization policies) to determine whether the user is allowed to execute that command. For example, access to certain commands may be different for different users. In addition, access to certain files or groups of files (e.g., directories or containers) may be different for different users. If a GUI is used to execute commands, it is important that the GUI adhere to the file system's authorization policies, to prevent malicious or otherwise unwanted access to files. A GUI that does not properly adhere to the file system's authorization policies may introduce a security vulnerability that threatens the proper operation of the file system and of applications and services using the file system.

The set of commands available in a typical file system API is limited and predefined. Commands available in the file system may include read, write, execute, etc. Standard file system commands do not allow for more complicated types of data operations. For example, file systems typically do not include commands for accessing features of cloud storage, such as archiving, caching, etc.

For features not available through the file system directly, an application or service may be used that executes independently from the file system. Using the separate application or service may involve accessing a specialized GUI that provides access to the additional features. For example, a web application may be used to administer features of a cloud service. However, as noted above, using a specialized GUI may introduce security vulnerabilities, if the GUI does not properly adhere to the file system's authorization policies. Moreover, if some commands are executed in a CLI and other commands are executed via a GUI, user workflow may be negatively impacted due to the time and inefficiency involved in switching computing contexts.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 4A to 4E illustrate examples of using embedded commands in accordance with one or more embodiments; and FIG. 5 shows a block diagram that illustrates a computer system in accordance with one or more embodiments.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. COMPOSITE COMMAND ARCHITECTURE
4. PROCESSING A COMPOSITE COMMAND
5. EXAMPLE EMBODIMENTS OF EMBEDDED COMMANDS
6. COMPUTER NETWORKS AND CLOUD NETWORKS
7. MISCELLANEOUS; EXTENSIONS
8. HARDWARE OVERVIEW

1. General Overview

One or more embodiments include a file system configured to execute a composite command. The file system receives the composite command, which includes a non-embedded command and an argument. The file system parses the argument. While parsing the argument, the file system encounters a particular flag indicating that the argument includes an embedded command. The file system executes the embedded command using an application programming interface (API).

In one or more embodiments, the embedded command is an internal command of the file system, i.e., a command that is accessible via the file system's internal API. Alternatively, the embedded command may be an external command, i.e., a command of a system external to the file system. If the embedded command is an external command, then the file system calls the external system's API and receives a response. The response may be used as input to the non-embedded command. The non-embedded command may be an internal command of the file system and may be used in other commands that are not composite commands.

In one or more embodiments, the composite command's argument also includes a system path. The file system may generate a symbolic link from the system path to the embedded command. The file system may receive a subsequent command that references the symbolic link. Accessing the symbolic link may result in re-executing the embedded command.

One or more embodiments described in this Specification and/or recited in the claims may not be included in this General Overview section.

2. System Architecture

Figure 1:
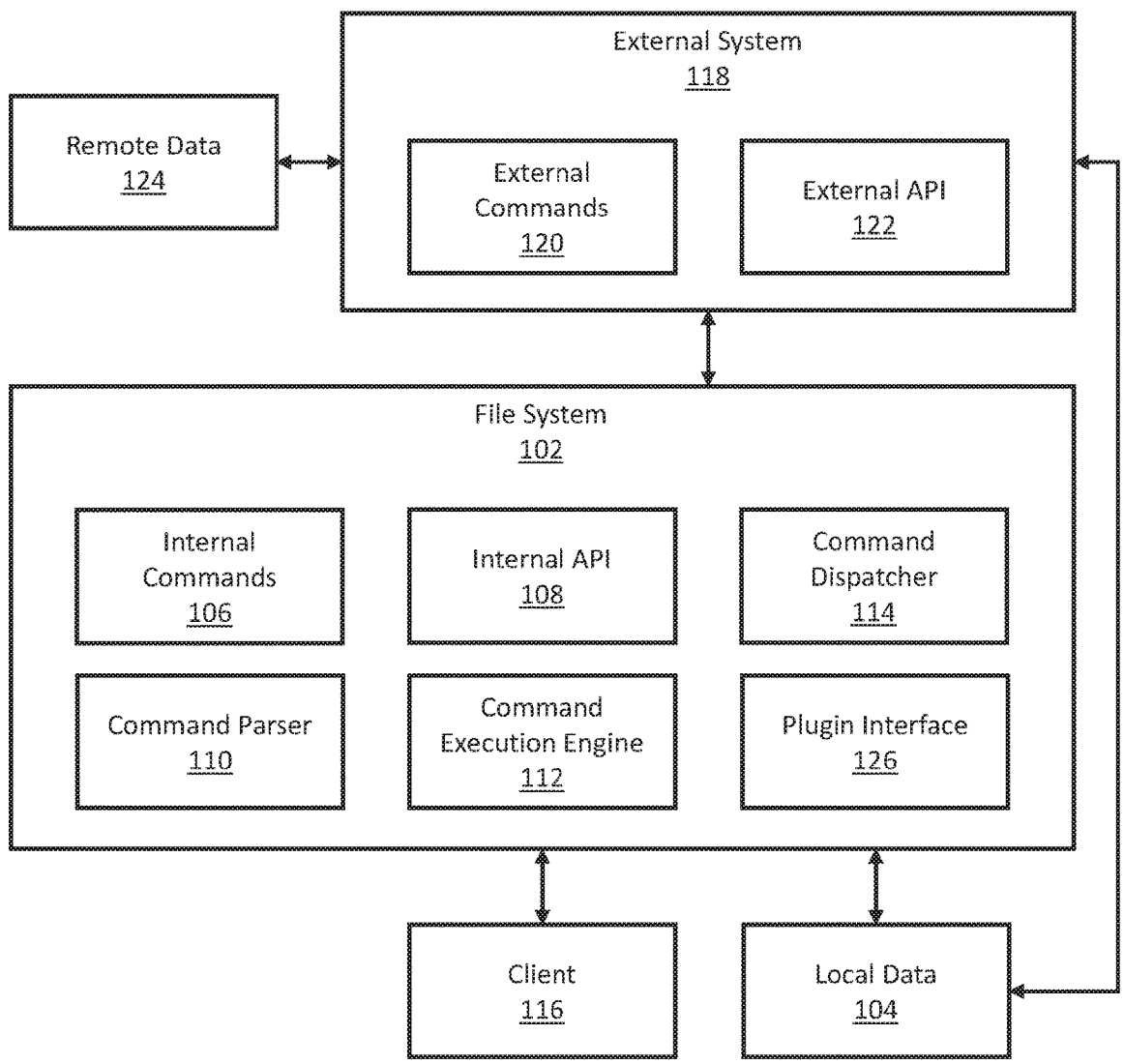
FIG. 1 illustrates a system in accordance with one or more embodiments.

FIG. 1 illustrates a system 100 in accordance with one or more embodiments. As illustrated in FIG. 1, system 100 includes a client 116, a file system 102, and an external system 118. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in Section 6, titled "Computer Networks and Cloud Networks."

In one or more embodiments, the file system 102 provides a structure and set of rules for storing and retrieving local data 104 in the system 100. Specifically, the file system 102 includes a set of internal commands 106 for storing and retrieving the local data 104. The internal commands 106 are called 'internal' because they are part of the file system 102 itself, i.e., they are part of the file system 102's code base. Different file systems include different sets of internal commands. For example, file systems compliant with Portable Operating System Interface (POSIX) standards include internal commands that are accessible using operating system commands such as cat (to send the contents of one or more files to standard output), chmod (to modify file permissions), cp (to copy files), mv (to move or rename a file), and rm (to delete a file or directory).

In one or more embodiments, the local data 104 is called 'local' because it is accessible using the internal commands 106. The term 'local' does not necessarily imply physical proximity. The local data 104 may be stored using any type of storage unit and/or device for storing data. Further, the local data 104 may include multiple different storage units and/or devices. The multiple different storage units and/or devices may or may not be of the same type or located at the same physical site. Further, the local data 104 may be stored on the same computing system as the file system 102. Alternatively or additionally, the local data 104 may be stored on a computing system separate from the file system 102. The local data 104 may be communicatively coupled to the file system 102 via a direct connection or via a network.

In one or more embodiments, the file system 102 is configured to receive commands from a client 116. The client 116 is any kind of hardware and/or software configured to use the file system 102 to store and retrieve the local data 104. For example, the client 116 may include a command line interface (CLI) or graphical user interface through which a user issues commands to the file system 102. The file system 102 receives commands from the client 116 via an internal application programming interface (API) 108. The internal API 108 is called 'internal' because it is part of the file system 102 itself, i.e., it is part of the file system 102's code base. Different file systems provide different internal APIs corresponding to the internal commands available.

In one or more embodiments, the external system 118 is an application or service that is not part of the file system 102's code base and therefore executes separately (i.e., 'externally') from the file system 102. Specifically, the external system 118 includes external commands 120 that are not the internal commands 106 of the file system 102. The external system 118 exposes the external commands 120 via an external application programming interface (API) 122.

In one or more embodiments, the external commands 120 include commands for storing and retrieving the local data 104 in ways that are not supported by the internal commands 106. Alternatively or additionally, the external commands may be used to store and/or retrieve remote data 124. The remote data 124 is called 'remote' because it cannot be stored and/or retrieved using the file system 102's internal commands 106 in the same manner as the local data 104. The term 'remote' does not necessarily imply physical distance. The remote data 124 may be stored using one or more different device(s) as the local data 104. Alternatively or additionally, the remote data 124 may be stored using one or more of the same device(s) as the local data 104.

In one or more embodiments, the file system 102 includes a command parser 110, a command execution engine 112, and/or a command dispatcher 114. The command parser 110, command execution engine 112, and command dispatcher 114 refer to functionality of the file system 102 that may be implemented in any number of functional components of the file system 102 (e.g., methods, functions, procedures, subroutines, etc.). There may be overlap between one or more of the functional components used to implement the command parser 110, command engine 112, and command dispatcher 114. Alternatively, the command parser 110, command engine 112, and command dispatcher 114 may be implemented as distinct functional components of the file system 102.

In one or more embodiments, the file system 102 is configured to process composite commands and embedded commands. When the file system 102 receives a command from the client 116, the command parser 110 examines the command's syntax to identify which specific command(s) were issued. If a command is one of the internal commands 106, then the command execution engine 112 executes the command locally, i.e., within the file system 102's code base. If the command is a composite command, it includes an embedded command. The embedded command may be one of the internal commands 106 or one of the external commands 120. If the embedded command is one of the internal commands 106, then the command execution engine 112 executes the embedded command locally. If the embedded command is one of the external commands 120, then the command dispatcher 114 dispatches the command to the external API 122 for processing by the external system 118. Examples of composite commands and embedded commands are described below. Examples of operations for processing composite commands and embedded commands also are described below.

In one or more embodiments, the file system 102 includes a plugin interface 126 through which API commands may be registered for use as embedded commands. Specifically, via the plugin interface 126, a command group may register commands belonging to that command group and a unique identifier (ID) for the command group. If the commands are implemented in a Java programming language, the command group may register a Java class containing the commands. For example, a command group providing access to cloud storage operations may register a Java class with the unique command group ID of "cloud" and commands such as "cloud-object-count," "pending-uploads," "cloud-checksum," etc. The plugin interface 126 may also be used to register help information to be output if a composite command is invalid. For example, an invalid composite command may include a command group ID without including an embedded command name, include an invalid embedded command name, etc. The help information may include, for example, a list of embedded commands associated with the command group.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Composite Command Architecture

Figure 2:
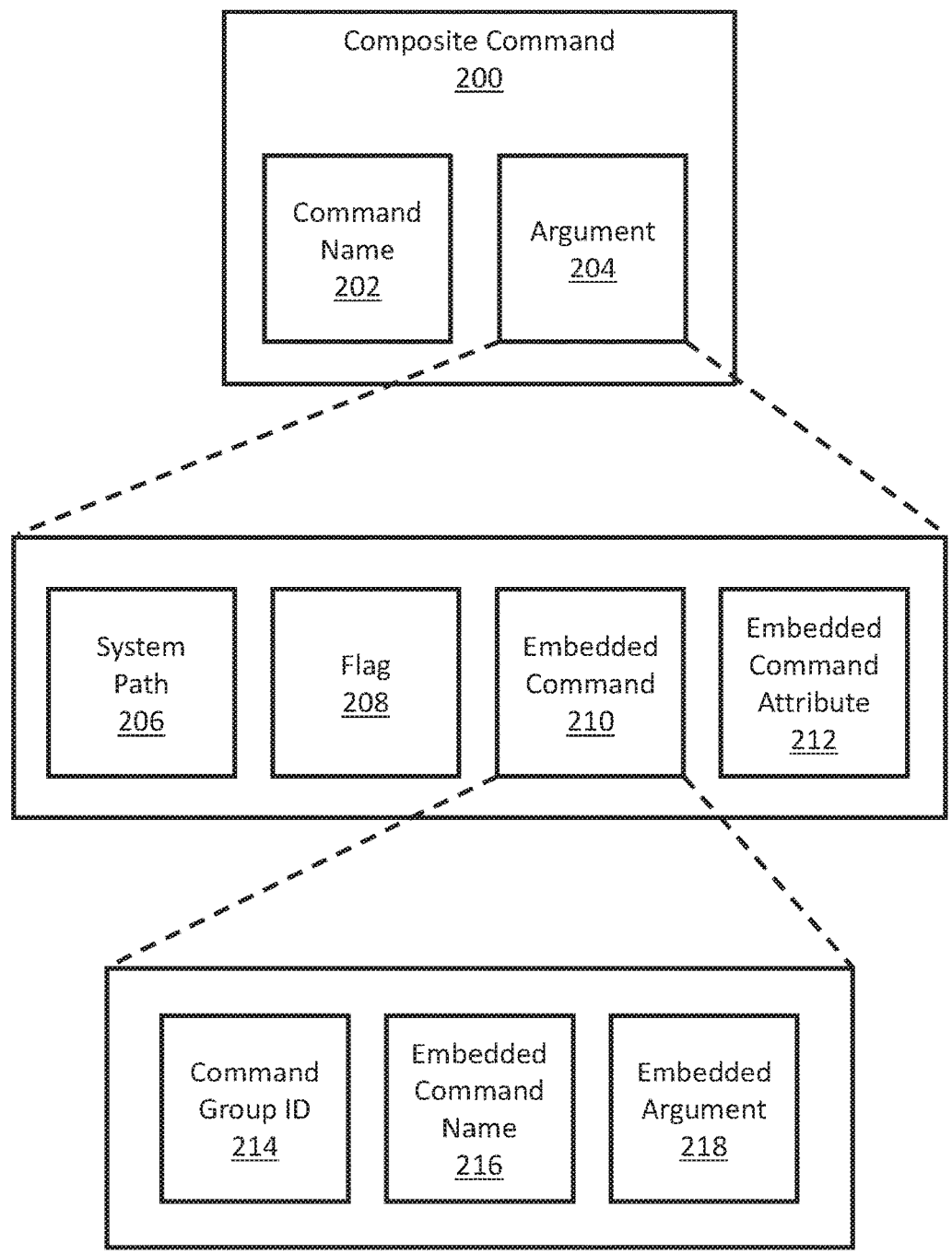
FIG. 2 illustrates a composite command in accordance with one or more embodiments.

FIG. 2 illustrates a composite command 200 in accordance with one or more embodiments. The composite command 200 is a set of instructions to be processed by a file system. For example, a file system may receive the composite command 200 from a client, via an internal API, as described above. In one or more embodiments, the composite command 200 is a text command entered by a user in a command line interface (CLI). Components of the composite command 200 may refer to segments of text. Components of the composite command 200 may be ordered left-to-right as illustrated in FIG. 2. Alternatively or additionally, a different ordering may be used. In one or more embodiments, the composite command 200 may include more or fewer components than the components illustrated in FIG. 2.

In one or more embodiments, the composite command 200 includes a command name 202 and an argument 204. The command name 202 identifies a command to be executed by the file system. Specifically, the command name 202 may refer to an internal command of the file system. For example, in a POSIX-compliant file system, the command name 202 may be the word 'cat'. The command name 202 may refer to many different commands, depending on the specific file system and the user's intentions.

In one or more embodiments, the argument 204 provides additional information to be processed before, during, and/or after executing the command identified in the command name 202. Specifically, the argument 204 may include a system path 206. The system path 206 indicates a location in the file system where data may be stored and/or retrieved by the command identified in the command name 202. In one or more embodiments, the system path 206 indicates the location of a symbolic link. Examples of operations for generating and using a symbolic link are described below.

In one or more embodiments, the composite command 200 is referred to as 'composite' because the argument 204 includes an embedded command 210. As described in further detail below, the embedded command 210 identifies a command separate from the command identified by the command name 202. In contrast, a command with an argument that does not include an embedded command may be referred to as a 'unary' command.

In one or more embodiments, the argument 204 includes a flag 208. The flag 208 indicates (i.e., 'flags') that the argument 204 includes the embedded command 210. If the composite command 200 is a text command, then the flag 208 may be a particular sequence of characters. In general, it may be preferable for the flag 208 to be a sequence of characters that is unlikely to be used for other purposes in the file system. For example, the flag 208 may be a series of three colons (':::'). Many different sequences of characters may be used for the flag 208. The flag 208 may be placed immediately to the left of the embedded command 210 or in any other location in the argument 204 that will assist a command parser in identifying the embedded command 210.

In one or more embodiments, the argument 204 includes an embedded command attribute 212. The embedded command attribute 212 may provide additional information (i.e., one or more 'attributes') to help the file system process the embedded command 210. For example, an embedded command attribute 212 may indicate a particular amount of time to wait before fully processing the embedded command 210. As another example, the attribute may indicate a background process that must finish before fully processing the embedded command 210. Continuing with this example, a background process may be used to copy a file to a cloud storage service. For a subsequent embedded command 210 to be dispatched to the cloud storage service, an embedded command attribute 212 may indicate that the copy operation must finish before dispatching the embedded command 210 to the cloud storage service. As another example, an embedded command attribute 212 may indicate a log level to use while executing the embedded command 210. Continuing with this example, an embedded command attribute 212 of 'DEBUG' may provide a greater amount of log data than an embedded command attribute 212 of 'INFO'. Other examples may include, for example, an embedded command designed to determine the path of a file, given an associated file ID as an embedded command attribute 212. Many different types of embedded command attributes 212 may be used in association with many different types of embedded commands 210.

In one or more embodiments, the embedded command attribute 212 is separated from the embedded command 210 using a special character, such as a colon. For example, an embedded diagnostic command to be executed using a 'DEBUG' log level may be typed as ':::diag:log-level: DEBUG'. In this example, the three colons are a flag 208 as discussed above, 'diag' is an embedded command name 216 as discussed below, and 'log-level:DEBUG' is an embedded command attribute 212.

In one or more embodiments, the embedded command 210 includes information about a command to be processed by the file system, separate from the command identified by the command name 202. Specifically, the embedded command 210 includes an embedded command name 216 identifying the additional command. The embedded command name 216 may identify an internal command of the file system. Alternatively or additionally, the embedded command name 216 may identify an external command, i.e., a command that is part of an external system and accessible using an external API, as described above.

In one or more embodiments, commands that are accessible using an embedded command 210 are organized into command groups. The embedded command 210 may include a command group identifier (ID) 214 identifying the particular command group corresponding to the embedded command name 216. For example, commands used to store and retrieve data via a cloud storage gateway (e.g., archiving, restoring, verifying checksums and/or data integrity, checking the status of a local data cache, checking the status of other cloud storage-related commands, managing caching and/or persistence policies for local data, managing encryption, managing file segmentation policies, etc.) may be grouped into a command group with the ID 'archive'. Commands used to obtain metadata (e.g., information about files, objects, etc. stored in local data and/or remote data), may be grouped into a command group with the ID 'meta'. Commands used to manage network resources may be grouped into a command group with the ID 'network'. Commands used to perform system diagnostics (e.g., testing, troubleshooting, checking available memory, starting and/or stopping services, checking the status of services and/or threads, changing logging levels in a runtime environment, etc.) may be grouped into a command group with the ID 'diag'. Many different types of commands, groupings of commands, and IDs used to identify those groupings may be used. A command group ID 214 may be helpful, in particular, in an embodiment where commands with different functionality may have the same embedded command name 216.

In one or more embodiments, the embedded command 210 includes an embedded argument 218. The embedded argument 218 provides additional information to be processed before, during, and/or after executing the command identified in the embedded command name 216. For example, as with the argument 204, the embedded argument 218 may include a system path or an attribute to use before, during, and/or after executing the command identified in the embedded command name 216. Further, the embedded argument 218 may include an additional embedded command, and may include an additional flag indicating that the embedded argument 218 includes an additional embedded command. In other words, the composite command 200 may include multiple levels of nested embedded commands.

4. Processing a Composite Command

Figure 3:
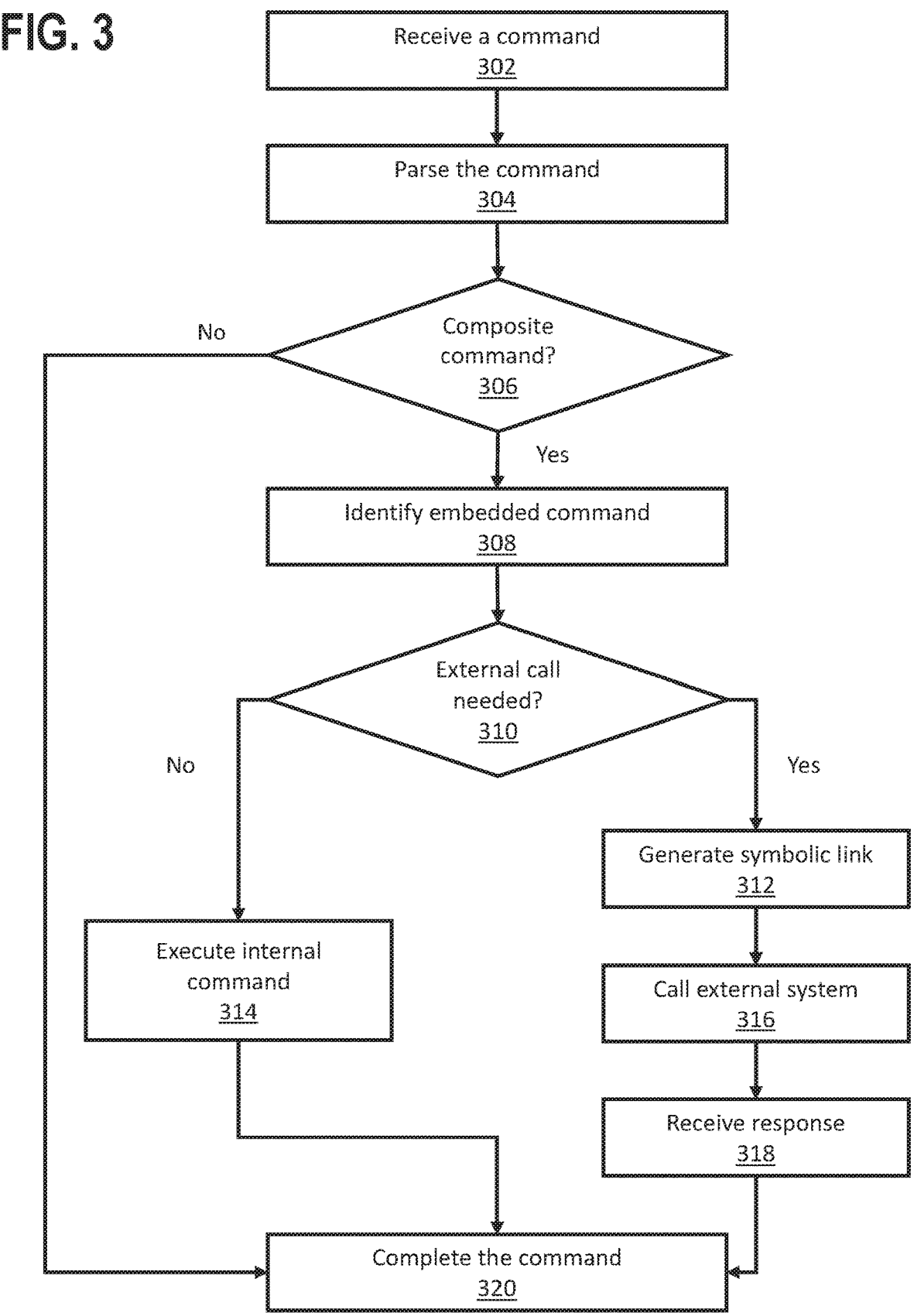
FIG. 3 illustrates an example set of operations for executing an embedded command in accordance with one or more embodiments.

FIG. 3 illustrates an example set of operations for processing a composite command in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

In one or more embodiments, a file system receives a command (Operation 302). Specifically, the file system may receive the command from a client, via an internal API. At the time the file system receives the command, it may not yet be known whether the command is a composite command (i.e., a command that includes an embedded command) or a unary command (i.e., a command that does not include an embedded command). The file system may receive the command while processing a user-defined script. A script is a sequence of commands stored for repeated use. For example, UNIX operating systems support shell scripts that may be run by a command line interpreter. Scripts may be implemented using a variety of different scripting languages.

In one or more embodiments, the file system parses the command (Operation 304). Parsing the command involves determining the components of the command based on a known command syntax. For example, the file system's command parser may expect commands in the form: [command-name] [argument]. The command parser may also parse the argument to identify the argument's components.

In one or more embodiments, the file system determines whether the command is a composite command (Operation 306). For example, the command may be a composite command if the command parser encounters a particular flag indicating that the command is a composite command. If the command parser does not encounter the particular flag, then the command is a unary command.

In one or more embodiments, if the command is not a composite command, i.e., the command is a unary command, then the file system completes the command (Operation 320). Completing a unary command may involve simply executing the command indicated by the command name, using the argument provided.

In one or more embodiments, if the file system determines that the command is a composite command (e.g., if the particular flag is encountered during command parsing), then the file system identifies the embedded command (Operation 308). Identifying the embedded command involves identifying the embedded command name. If embedded commands are organized into command groups, then identifying the embedded command may also involve identifying the command group identifier (ID). Alternatively or additionally, identifying the embedded command may involve identifying an associated embedded command attribute. For example, the command parser may determine that the argument includes an embedded command attribute specifying a particular time at which to execute the command indicated in the embedded command name.

In one or more embodiments, the file system determines whether an external call is needed to execute the embedded command (Operation 310). Specifically, if the embedded command name refers to an internal command, i.e., a command that is part of the file system's code base, then an external call may not be needed. The file system may execute the internal command using its own command execution engine (Operation 314). Specifically, the file system may execute the internal command by calling the file system's internal API. However, if the embedded command name refers to an external command, i.e., a command that is not part of the file system's code base, then to execute the embedded command, the file system may need to issue a call to an external API.

In one or more embodiments, when processing an external command, the file system generates a symbolic link (Operation 312). Specifically, the file system may generate a symbolic link between (a) the system path provided in the command and (b) the external command. Some file systems cache the results of executing a command, so that a subsequent call to the same command may result in receiving the contents of the cache rather than re-executing the command. However, a file system may have less aggressive caching (or no caching at all) of data returned via symbolic links. Thus, accessing an external command via a symbolic link may provide a greater assurance of receiving current data each time. In general, using symbolic links in this manner may be helpful when using external commands to access data that changes frequently. For example, an external command may return the status of an archive operation in a cloud storage gateway. If the file system caches command results, then a subsequent call to the external command may result in receiving a cached status of the archive operation, rather than re-executing the external commend to obtain the current status of the archive operation. Accessing the external command via a symbolic link may ensure that the external command is re-executed each time to obtain the current status of the archive operation. Thus, in one or more embodiments, using a symbolic link improves operation of the file system by providing a symbolically linked system path that, when accessed, ensures that the data received in return is more current and therefore more useful. In addition, the file system may generate a separate symbolic link each time it receives a composite command, so that different users calling the same external command do not receive each other's data.

In one or more embodiments, the file system executes the external command by issuing a call to the external system (Operation 316). Specifically, the file system calls an external API of the external system. When the external system has executed the external command, the file system receives a response from the external system (Operation 318). Many different types of response may be received. For example, if the external system is a cloud storage gateway, a call to execute an archive command may return information about the status of an archive operation. A call to retrieve data from a cloud storage gateway may return a stream of the data requested. A call to provide metadata associated with the external system may include the metadata. If the call to the external system is not properly formatted, or the file system lacks appropriate authorization, or the external command cannot be executed for some other reason, the call may return an error message. In general, in one or more embodiments, the call to the external system returns data that would not have been accessible using only internal commands of the file system itself. Thus, one or more embodiments improve functioning of the file system by providing access to external data and/or functionality that would not have otherwise been available, using a composite command issued to the file system itself.

In one or more embodiments, after executing an embedded internal command (Operation 314) or an embedded external command (Operations 312, 316, 318), the file system completes the command 220. In the case of a composite command, completing the command may involve executing the non-embedded command. Executing the non-embedded command may involve using the results of the embedded command as input to the non-embedded command. For example, if the file system is POSIX-compliant and the non-embedded command is 'cat', then the file system may dump the results of the embedded command to standard output. The results of an embedded command may be used as input to a non-embedded command in many different ways.

In one or more embodiments, composite commands as described herein may improve functioning of a file system in various ways. For example, as noted above, allowing a composite command to include an embedded external command may provide access to external data and/or functionality that would not have otherwise been available via the file system. As another example, using composite commands may improve security of the file system, because commands issued via the file system are subject to the file system's authorization policies. As noted above, a separate GUI or other specialized interface may not properly adhere to the file system's authorization policies. As another example, using composite commands may improve user workflow by avoiding the need for the user to exit the file system's CLI to access a GUI or other specialized interface for executing external commands.

5. Example Embodiments of Embedded Commands

A detailed example is described below for purposes of clarity. Components and/or operations described below should be understood as one specific example which may not be applicable to certain embodiments. Accordingly, components and/or operations described below should not be construed as limiting the scope of any of the claims.

Figure 4A:
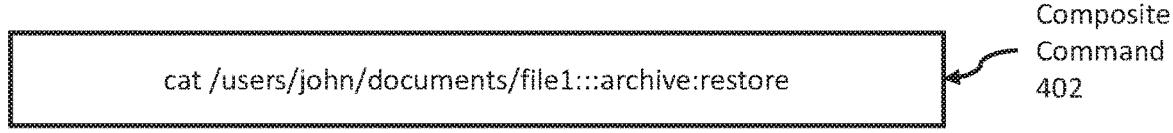

FIG. 4A shows an illustration of an example of a composite command 402 in accordance with one or more embodiments. Using the terminology described above with reference to composite command architecture, the command name is 'cat', the system path is '/users/john/documents/file1', the flag is '::::', the command group identifier (ID) is 'archive', and the embedded command name is 'restore'. In this example, the composite command 402 results in the file system calling a cloud storage gateway to restore data, i.e., copy remote data to local data. The file system generates a symbolic link from the file path to the restore command. Because the non-embedded command is 'cat', when the file system receives a response from the cloud storage gateway, the file system dumps the response to standard output. For example, the response may be a message indicating that the restore command has commenced. In this context, the 'cat' command effectively functions as a read operation.

Figure 4B:
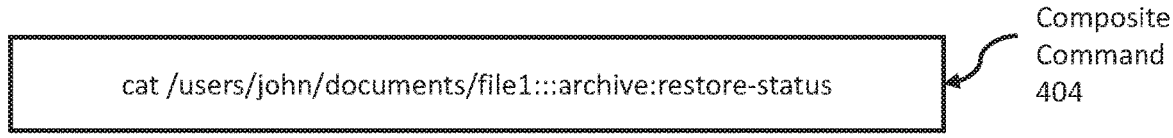

Continuing the example, FIG. 4B shows an illustration of an example of a composite command 404 in accordance with one or more embodiments. Using the terminology described above with reference to composite command architecture, the command name is 'cat', the system path is '/users/john/documents/file1', the flag is '::::', the command group identifier (ID) is 'archive', and the embedded command name is 'restore-status'. In this example, the composite command 404 results in the file system calling the cloud storage gateway to determine the status of the restore command of FIG. 4A. Because the non-embedded command is 'cat', when the file system receives a response from the cloud storage gateway, the file system dumps the response to standard output. For example, the response may be a message indicating that the restore command is fifty percent complete.

Figure 4C:
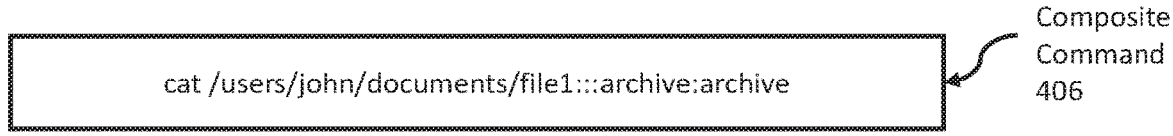

Continuing the example, FIG. 4C shows an example of a composite command 406 in accordance with one or more embodiments. Using the terminology described above with reference to composite command architecture, the command name is 'cat', the system path is '/users/john/documents/file1', the flag is '::::', the command group identifier (ID) is 'archive', and the embedded command name is 'archive'. In this example, supposing that the restore command of FIG. 4A is complete, the composite command 406 results in the file system calling the cloud storage gateway to archive local data to remote data. Because the non-embedded command is 'cat', when the file system receives a response from the cloud storage gateway, the file system dumps the response to standard output. For example, the response may be a message indicating that the archive command has commenced.

Figure 4D:
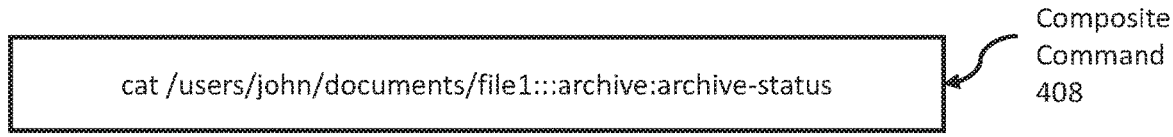

Continuing the example, FIG. 4D shows an illustration of an example of a composite command 408 in accordance with one or more embodiments. Using the terminology described above with reference to composite command architecture, the command name is 'cat', the system path is '/users/john/documents/file1', the flag is ':::', the command group identifier (ID) is 'archive', and the embedded command name is 'archive-status'. In this example, the composite command 404 results in the file system calling the cloud storage gateway to determine the status of the archive command of FIG. 4C. Because the non-embedded command is 'cat', when the file system receives a response from the cloud storage gateway, the file system dumps the response to standard output. For example, the response may be a message indicating that the archive command is complete.

FIG. 4E shows an illustration of an example of a composite command 410 in accordance with one or more embodiments. In this example, the composite command 410 is invalid, because it includes a command group ID ('cache') but does not include a corresponding embedded command name. Attempting to execute the invalid composite command 410 (for example, by entering the composite command 410 using a CLI) may result in receiving help information 412. For example, as shown in FIG. 4E, help information 412 may include a list of commands that are associated with the designated command group ID.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause performance of operations comprising:
receiving, by a file system, a first command comprising a command name, a flag, and a first argument, wherein the flag is stored separately from the first argument;
while parsing the first command, encountering the flag indicating that the first argument, of the first command, comprises a second command;
executing, by the file system, the second command to obtain results corresponding to the second command; and
executing the first command using the results corresponding to the second command.

2. The one or more media of claim 1, wherein the second command is different than the first command identified by the command name.

3. The one or more media of claim 1, wherein the first argument further comprises a system path that stores instructions that, when executed by one or more processors, cause generating a symbolic link from the system path to the second command.

4. The one or more media of claim 3, further comprising accessing the symbolic link, the accessing causing re-execution the second command.

5. The one or more media of claim 1, wherein the second command comprises a command group identifier and a second command name.

6. The one or more media of claim 1, wherein the first command is executed by a first system and the second command is executed by a second system different from the first system.

7. The one or more media of claim 1, wherein the first command and the second command are executed by a same system.

8. The one or more media of claim 1, wherein the flag comprises a sequence of characters reserved for indicating the second command in the first argument of the first command, the sequence of characters between the command name and the second command.

9. The one or more media of claim 1, wherein the second command further comprises a second command name and a command attribute specifying one or more criteria for the executing of the second command.

10. The one or more media of claim 9, wherein the second command further comprises an attribute character reserved for indicating the command attribute within the second command, the attribute character between the second command name and the command attribute.

11. One or more non-transitory computer-readable media storing instructions, which when executed by one or more hardware processors, cause performance of operations comprising:
receiving, by a file system, a command that is one of a unary command or a compound command;
determining whether the command is a compound command or a unary command based on detecting a flag present in the compound command and not present in the unary command;
responsive to detecting the flag, identifying within the compound command a first command comprising a command name and an argument, and further detecting a second command embedded in the argument of the first command;
executing the second command to obtain second command results; and
executing the first command using the second command results.

12. The one or more media of claim 11, wherein the first command and the second command are different.

13. The one or more media of claim 11, wherein the argument of the first command further comprises a system path that stores instructions that, when executed by one or more processors, cause generating a symbolic link from the system path to the second command.

14. The one or more media of claim 13, further comprising accessing the symbolic link, the accessing causing re-execution the second command.

15. The one or more media of claim 11, wherein the second command comprises a command group identifier and a second command name.

16. The one or more media of claim 11, wherein the first command is executed by a first system and the second command is executed by a second system different from the first system.

17. The one or more media of claim 11, wherein the first command and the second command are executed by a same system.

18. The one or more media of claim 11, wherein the flag comprises a sequence of characters reserved for indicating the second command in the argument of the first command, the sequence of characters between the command name and the second command.

19. The one or more media of claim 11, wherein the second command further comprises a second command name and a command attribute specifying one or more criteria for the executing of the second command.

20. The one or more media of claim 19, wherein the second command further comprises an attribute character reserved for indicating the command attribute within the second command, the attribute character between the second command name and the command attribute.

* * * * *

UNITED STATES PATENT AND TRADEMARK OFFICE
CERTIFICATE OF CORRECTION

PATENT NO. : 11,494,346 B2
APPLICATION NO. : 16/919459
DATED : November 8, 2022
INVENTOR(S) : Byers et al.

It is certified that error appears in the above-identified patent and that said Letters Patent is hereby corrected as shown below:

On the Title Page

Column 1, under Assignee, Line 1, delete "Comporation," and insert -- Corporation, --, therefor.

On page 2, Column 1, under Other Publications, Line 11, delete "I" and insert -- | --, therefor.

On page 2, Column 1, under Other Publications, Line 15, delete "I" and insert -- | --, therefor.

In the Specification

In Column 3, Line 57, delete "my" and insert -- mv --, therefor.

Signed and Sealed this
Twentieth Day of June, 2023

Katherine Kelly Vidal
*Director of the United States Patent and Trademark Office*